(12) United States Patent
Closs et al.

(10) Patent No.: US 11,568,515 B2
(45) Date of Patent: Jan. 31, 2023

(54) METHOD AND APPARATUS FOR CONVERTING A DIGITAL IMAGE

(71) Applicants: STMicroelectronics (Grenoble 2) SAS, Grenoble (FR); STMicroelectronics (Rousset) SAS, Rousset (FR)

(72) Inventors: Julien Closs, Grenoble (FR); Jean-Michel Delorme, L'Isle d'Abeau (FR); Daniel Fauvarque, Crolles (FR); Laurent Folliot, Gourdon (FR); Guillaume Legrain, Grenoble (FR)

(73) Assignees: STMicroelectronics (Grenoble 2) SAS, Grenoble (FR); STMicroelectronics (Rousset) SAS, Rousset (FR)

( * ) Notice: Subject to any disclaimer, the term of this patent is extended or adjusted under 35 U.S.C. 154(b) by 0 days.

(21) Appl. No.: 17/361,783

(22) Filed: Jun. 29, 2021

(65) Prior Publication Data
US 2021/0407040 A1 Dec. 30, 2021

(30) Foreign Application Priority Data
Jun. 30, 2020 (FR) ...................................... 2006903

(51) Int. Cl.
*G06N 3/02* (2006.01)
*G06T 3/40* (2006.01)
*G06N 3/08* (2006.01)

(52) U.S. Cl.
CPC ............. *G06T 3/4023* (2013.01); *G06N 3/02* (2013.01); *G06N 3/08* (2013.01); *G06T 3/4046* (2013.01); *G06T 3/4076* (2013.01)

(58) Field of Classification Search
None
See application file for complete search history.

(56) References Cited

U.S. PATENT DOCUMENTS

| 6,023,281 A * | 2/2000 | Grigor ................. G06F 3/1431 |
| | | 345/502 |
| 6,091,777 A * | 7/2000 | Guetz ................. H04N 19/172 |
| | | 375/240.03 |

(Continued)

OTHER PUBLICATIONS

Arm Limited, "Image recognition on Arm 1-9 Cortex-M with CMSIS-NN", Arm Developer, Apr. 1, 2019, pp. 1-17, XP055785957.

(Continued)

*Primary Examiner* — Joni Hsu
(74) *Attorney, Agent, or Firm* — Slater Matsil, LLP (57) ABSTRACT

An embodiment method for converting an initial digital image into a converted digital image, electronic chip, system and computer program product are disclosed, the initial digital image comprising a set of pixels, the pixels being associated respectively with colors, the initial digital image being acquired by an acquisition device, and the converted digital image able to be used by a neural network. The embodiment method comprises redimensioning of the initial digital image in order to obtain an intermediate digital image, the redimensioning being carried out by a reduction in the number of pixels of the initial image, modification of a format of one of the pixels of the intermediate digital image in order to obtain a converted digital image, the modification being carried out, after the redimensioning, by increasing the number of bits used to represent the color of the pixel.

20 Claims, 4 Drawing Sheets (56) References Cited

U.S. PATENT DOCUMENTS

| | | | |
|---|---|---|---|
| 2002/0051061 A1* | 5/2002 | Peters | H04N 7/181 |
| | | | 348/E7.086 |
| 2020/0196065 A1 | 6/2020 | Pedersen et al. | |
| 2020/0258197 A1* | 8/2020 | Tai | G06N 3/0454 |
| 2020/0311871 A1* | 10/2020 | Yu | G06T 5/003 |
| 2021/0027102 A1* | 1/2021 | Ogura | G06K 9/36 |
| 2021/0166360 A1* | 6/2021 | Kim | G06F 17/11 |

OTHER PUBLICATIONS

Crochiere, Ronald E., et al., "Interpolation and Decimation of Digital Signals—A Tutorial Review", Proceedings of the IEEE, vol. 69, No. 3, Mar. 1981, 32 pages.

Navsuda, "add camera example with STM32F746NG-DISCO board ARM-software/ML-examples", Mar. 6, 2019, pp. 1-6, XP055785952.

* cited by examiner

METHOD AND APPARATUS FOR CONVERTING A DIGITAL IMAGE

CROSS-REFERENCE TO RELATED APPLICATIONS

This application claims the priority benefit of French Application No. 2006903, filed on Jun. 30, 2020, which application is hereby incorporated herein by reference.

TECHNICAL FIELD

The present disclosure relates, generally, to an apparatus and method for converting digital images, in particular for adapting the format of a digital image exchanged between two devices that do not use the same digital image format. In an embodiment one of the devices is an image acquisition device and the other device is a neural network.

BACKGROUND

A digital image designates an image stored in binary form. It comprises a set of pixels or points. The pixels are organized into lines and columns. Each pixel is associated with a color.

The digital image is shown in the form of a matrix of values. Each value is associated with a pixel and represents the color of the pixel. The matrix comprises as many lines as the image has lines. The matrix comprises as many columns as the image has columns.

The color of the pixel is generally broken down into three primary components. These three primary components make it possible to find the color of the pixel by additive synthesis. These three primary components are: a red component, a green component and a blue component. The value associated with each pixel then comprises three values that correspond respectively to the intensity of each primary component. The intensity of each primary component is represented by a determined number of bits. The expression "coded" can also be used instead of the expression "represented".

For example, in the RGB565 format the red component is represented by 5 bits, the green component by 6 bits and the blue component by 5 bits. Each color is thus represented by 16 bits or 2 bytes.

In the RGB888 format the red component is represented by 8 bits, the green component by 8 bits and the blue component by 8 bits. Each color is thus represented by 24 bits or 3 bytes.

A two-dimensional digital image has a width and a height. The format of the digital image is defined by different parameters among which:
the number of pixels in width of the digital image,
the number of pixels in height of the digital image and
the number of bits used to represent the value of the color of each pixel.

The couple (number of pixels in width of the digital image; number of pixels in height of the digital image) is generally called the definition of the digital image. The definition is noted as X*Y where X represents the number of pixels in width of the digital image and Y the number of pixels in height of the digital image.

When an image acquisition device and a device using the image do not work with the same digital image format, these two devices cannot work together. A conversion of the digital image is then carried out.

Figure 1:
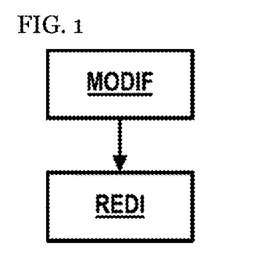
FIG. 1 shows a known method for converting.

FIG. 1 shows a known method of converting a digital image. This method of converting comprises a step of modifying MODIF a pixel format of an initial digital image, in order to obtain an intermediate digital image. This method comprises a step of redimensioning REDI the intermediate digital image, so as to obtain a converted digital image.

In this method of converting, the step of modifying MODIF is carried out prior to the step of redimensioning REDI.

This method of converting therefore makes it possible to supply a third-party device with a digital image acquired by the acquisition device, in the case where the image acquisition device and the third-party device do not work with the same digital image format.

The step of modifying MODIF of pixel format of the initial digital image makes it possible to modify the number of bits that make it possible to represent the colors of the pixels. If the color of a pixel is broken down into three primary components (red, green and blue), the step of modifying MODIF a pixel format of the initial digital image makes it possible to independently modify for each primary component the number of bits that make it possible to represent the primary component.

The step of redimensioning REDI of the intermediate digital image is carried out by the modification in the number of pixels of the intermediate digital image. This step of redimensioning REDI can be carried out by the decrease in the number of pixels in width of the intermediate digital image and/or the decrease in the number of pixels inn height of the intermediate digital image.

Figure 2:
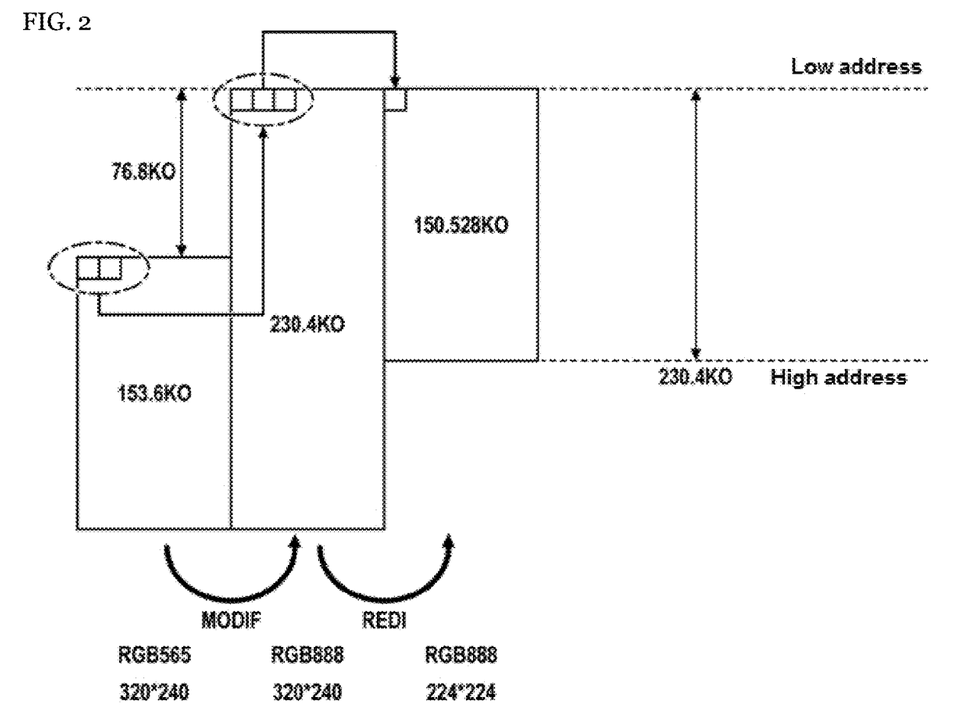
FIG. 2 shows a use of the known method for converting.

FIG. 2 shows an example of the use of the method known from FIG. 1.

In this use the modification MODIF of the format of the pixels of the initial digital image is carried out from a RGB565 format to a RGB888 format. Thus the number of bits used to represent the colors is increased. If the size of the initial digital image is L kilobytes (kb) then the size of the intermediate digital image is L*1.5 kilobytes.

In the example of use of FIG. 2, the step of redimensioning REDI makes it possible from an intermediate digital image having a resolution of 320*240 (resolution of digital images generally acquired by an acquisition device ACQUI of the camera type) to obtain a converted digital image having a resolution of 224*224 (resolution of digital images generally used by a neural network).

During the steps of modifying MODIF and redimensioning REDI the same zone of a memory MEM is used to store the initial digital image, the intermediate digital image and the converted digital image.

In order to minimize the size of the zone of the memory MEM, the values of the pixels of the intermediate digital image are written in place of the values of the pixels of the initial digital image. In order to minimize the size of the memory zone MEM, the values of the pixels of the converted digital image are written in place of the values of the pixels of the initial digital image or in place of values of the pixels of the intermediate digital image.

In the example of use of FIG. 2, the zone of the memory MEM has a size greater than the size of the initial digital image and greater than the size of the converted digital image. Indeed the initial digital image has a resolution of 320*240 and the color of each pixel is represented by 2 octets. The initial digital image therefore has a size of 153.6 kilobytes. The intermediate digital image has a resolution of 320*240 and the color of each pixel is represented by 3 octets. The intermediate digital image therefore has a size of 230.4 kilobytes. The converted digital image has a resolution of 224*224 and the color of each pixel is represented by 3 octets. The converted digital image therefore has a size of 150.6 kilobytes. Therefore in this case the size of the memory zone MEM must be 230.4 kilobytes, so as to be able to store the intermediate digital image.

Consequently, in order to perform the conversion between an initial digital image of size 153.6 kilobytes and a converted digital image of size 150.6 kilobytes, the known method of converting requires, in the example of use of FIG. 2, that the zone of the memory MEM be 230.4 kilobytes.

There is therefore a need for a method for converting a digital image that requires a lower quantity of memory.

SUMMARY

Embodiments of the invention make it possible to overcome the aforementioned disadvantages by proposing a method for converting an initial digital image into a converted digital image, the initial digital image comprising a set of pixels, the pixels being associated respectively with colors, the initial digital image being acquired by an acquisition device, the converted digital image able to be used by a neural network, the method comprising the following steps, redimensioning of the initial digital image in order to obtain an intermediate digital image, the redimensioning being carried out by a reduction in the number of pixels of the initial image, modification of a format of one of the pixels of the intermediate digital image in order to obtain a converted digital image, the modification being carried out by increasing the number of bits used to represent the color of the pixel. The redimensioning is carried out prior to the modification.

This method offers the advantage of being able to limit the quantity of memory required for the implementation thereof.

In an embodiment the initial digital image is stored at the beginning of a zone of a memory, the redimensioning is carried out by passing through the zone of the memory and by incrementing addresses of the zone of the memory. The modification is carried out by passing through the zone of the memory and by decrementing the addresses of the zone of the memory.

In an embodiment the initial digital image is stored at the end of a zone of a memory, the redimensioning is carried out by passing through the zone of the memory and by decrementing addresses of the zone of the memory. The modification is carried out by passing through the zone of the memory and by incrementing the addresses of the zone of the memory.

In an embodiment the redimensioning of the initial digital image is carried out by decimation of the pixels of the initial digital image.

In an embodiment the redimensioning of the image of the initial digital image is carried out by low-pass filtering of the initial digital image then by decimation of pixels of the initial digital image.

Another aspect of the invention is an electronic chip configured to implement the method of converting presented hereinabove.

In an embodiment the electronic chip comprises a processing unit and a memory. The processing unit is configured to implement the method of converting presented hereinabove.

Another aspect of the invention is a system comprising a device for acquiring an initial digital image, a neural network that uses a converted digital image, and an electronic chip able to convert the initial digital image into the converted digital image.

Another aspect of the invention is a computer program product comprising program instruction code that when it is executed by an electronic chip allows for the implementation of the method of converting presented hereinabove.

BRIEF DESCRIPTION OF THE DRAWINGS

Other characteristics, purposes and advantages of the invention shall come from the following description, which is purely for the purposes of information and not limiting, and which must be read with regards to the accompanying drawings wherein.

DETAILED DESCRIPTION OF ILLUSTRATIVE EMBODIMENTS

Figure 3:
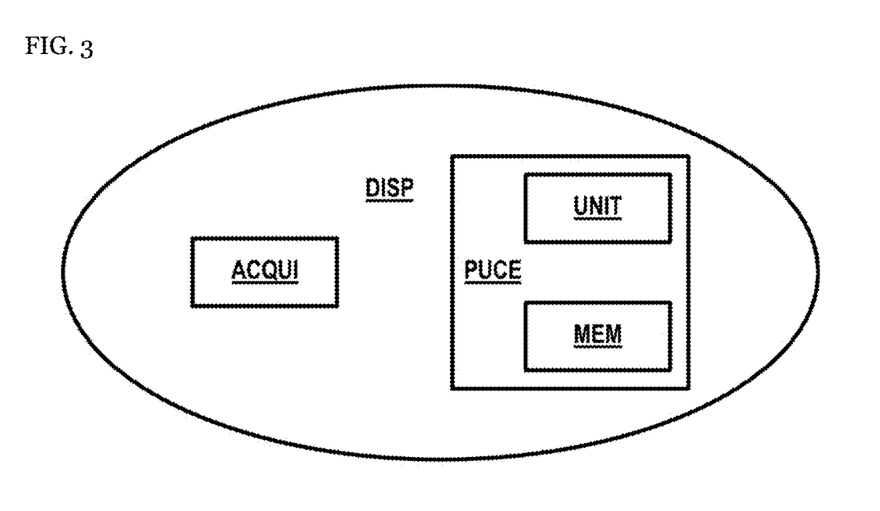
FIG. 3 shows a device according to an aspect of the invention.

FIG. 3 shows a device DISP comprising a device for acquiring ACQUI a digital image and an electronic chip PUCE. The electronic chip PUCE comprises a processing unit UNIT and a memory MEM. The memory MEM makes it possible to store values in locations associated respectively with addresses.

The device DISP can be a user device, for example a smartphone, a computer tablet, a computer.

The processing unit UNIT is configured to implement a method for converting an initial digital image into a converted digital image.

The initial digital image is obtained from the acquisition device ACQUI.

The converted digital image is used by a neural network RN (not shown in FIG. 3).

The digital images (initial and converted) are represented in the form of matrices of values. Each value is associated with a pixel and represents the color of the pixel. The matrix of each image comprises as many lines as the image has lines. The matrix comprises as many columns as the image has columns.

The digital image is stored in a zone of the memory MEM. This storage is carried out by concatenating the elements of the matrix of the digital image by lines or by columns then by storing these elements in the zone of the memory MEM.

The zone of the memory MEM comprises a lower limit associated with a so-called low address. The zone of the memory MEM comprises an upper limit associated with a so-called high address.

Figure 4:
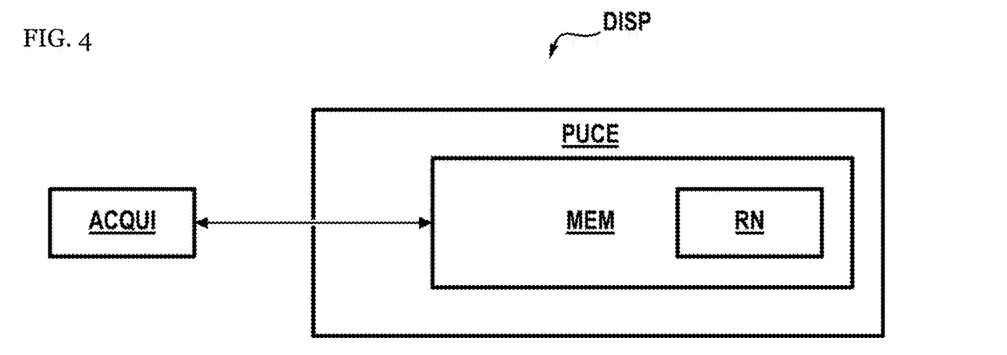
FIG. 4 shows in another way the device according to an aspect of the invention.

FIG. 4 shows in another way the device DISP. The memory MEM of the chip PUCE is also used to store the neural network RN using the converted digital image that was acquired by the acquisition device ACQUI then which was converted. This neural network RN can be stored in the zone of the memory MEM used for the converting of the initial digital image.

Figure 5:
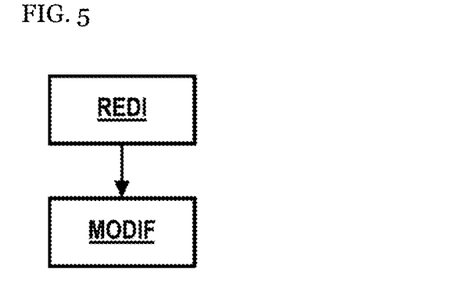
FIG. 5 shows a method of converting according to an aspect of the invention.

FIG. 5 shows a method of converting of the invention. The method of converting of the invention is implemented for example by the processing unit UNIT. The method of converting of the invention comprises a step of redimensioning REDI the initial digital image, in order to obtain an intermediate digital image. The method of converting of the invention comprises a step of modifying MODIF a format of pixels of the intermediate digital image, so as to obtain a converted digital image.

In the method for converting of the invention the step of redimensioning REDI is carried out prior to the step of modifying MODIF.

The step of redimensioning REDI of the initial digital image is carried out by the modification in the number of pixels of the initial digital image. This step of redimensioning REDI can be carried out by decreasing the number of pixels of the width of the initial digital image and/or decreasing the number of pixels in of the height of the initial digital image.

This reduction can be carried out by decimation of pixels of the initial digital image. Decimation is also known by the expression subsampling. Sampling a physical image consists of taking values representing the color of the pixels of the physical image. This sample is taken with a defined interval between the pixels. Sampling the physical image makes it possible to obtain a digital image. The decimation of a digital image consists of decreasing the number of values taken. During the decimation, in the intermediate digital image, only a certain number of pixels of the initial digital image are retained. For example only one pixel every M pixels is retained, where M is called the decimation factor.

Prior to decimation, the step of redimensioning REDI can include a low-pass filtering of the initial digital image.

The step of modifying MODIF a pixel format of the intermediate digital image makes it possible to modify the number of bits used to represent the colors respectively associated with the pixels. If the color of the pixel is broken down into three primary components (red, green and blue), the step of modifying MODIF a format of the pixels of the initial digital image makes it possible to independently modify for each primary component the number of bits used to represent this primary component.

In a first embodiment of the method of converting of the invention, the step of redimensioning REDI is carried out by passing through the zone of the memory MEM in a first direction and the step of modifying MODIF is carried out by passing through the zone of the memory MEM in a second direction. The first direction is identical to the second direction.

Figure 6:
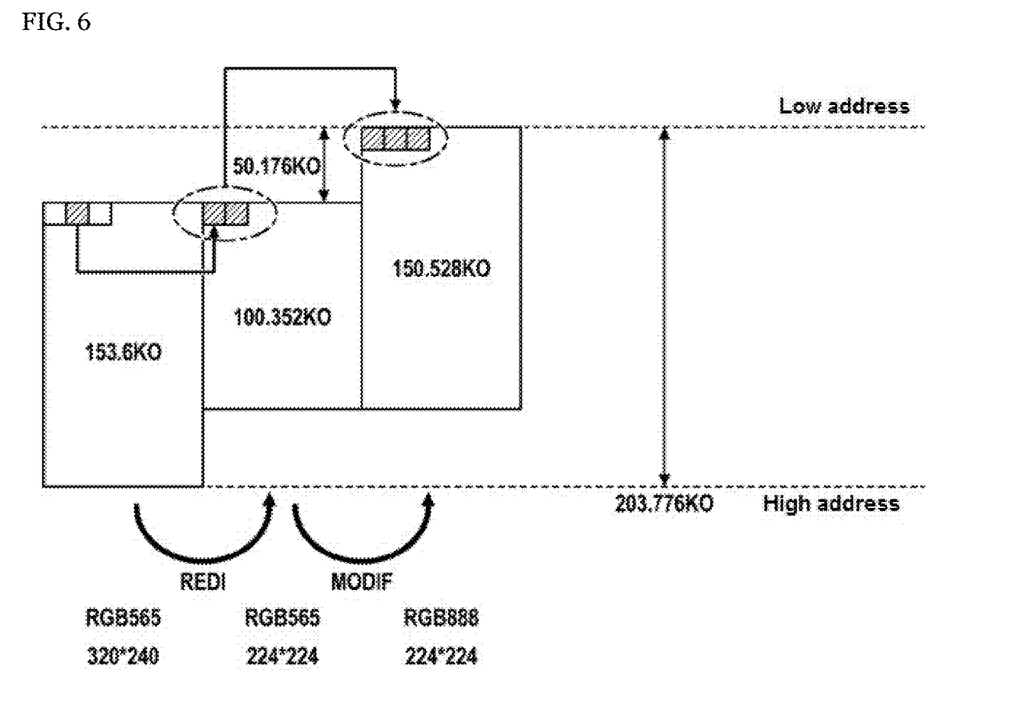
FIG. 6 shows a use of a first embodiment of the method of converting of the invention.

FIG. 6 shows an example of the use of the first embodiment of the method of converting of the invention shown in FIG. 5.

In the example of use of FIG. 6, the step of redimensioning REDI makes it possible, from an initial digital image having a resolution of 320*240 (resolution of digital images generally acquired by an acquisition device ACQUI of the camera type), to obtain an intermediate digital image having a resolution of 224*224 (resolution of the digital images generally used by the neural network RN).

In the example of use of FIG. 6, the step of modification MODIF of the format of the pixels of the intermediate digital image is carried out from a RGB565 format to a RGB888 format. The value of the color of each pixel is then represented and stored in the zone of the memory MEM by 3 bytes after the modification MODIF in format, and no longer by 2 bytes as before the modification MODIF in format. Therefore the step of modifying MODIF the format is carried out by increasing a number of bits used to represent the colors of the pixels. In this example of use, if the size of the intermediate digital image is L kilobytes then the size of the converted digital image is L*1.5 kilobytes, due to the modification MODIF of the pixel format.

In the example of use of FIG. 6, the initial digital image is stored in the zone of the memory MEM in such a way that the values of the initial digital image are stored continuously up to the high address. Thus the initial digital image is stored at the end of the zone of the memory MEM.

In the example of use of FIG. 6 the step of redimensioning REDI is carried out first. The intermediate digital image obtained after redimensioning is stored in the zone of the memory MEM in such a way that the address of the beginning of the intermediate digital image is close to or identical to the address of the beginning of the initial digital image.

In the example of use of FIG. 6 the step of redimensioning REDI is carried out from the low address and by incrementing the addresses up to the high address.

In the example of use of FIG. 6 the step of modifying MODIF of the intermediate digital image is carried out secondly. This conversion is carried out from the low address and by incrementing the addresses. The values of the pixels of the converted digital image are stored continuously starting from the low address. Thus the converted digital image is stored at the beginning of the zone of the memory MEM.

Carrying out the step of redimensioning REDI before the step of modifying MODIF makes it possible to limit the size of the memory zone MEM required for storing the different images.

Indeed, the initial digital image has a resolution of 320*240 and the color of each pixel is represented by 2 octets. The initial digital image has a size of 153.6 kilobytes. The intermediate digital image has a resolution of 224*224 and the color of each pixel is represented by 2 octets. The intermediate digital image has a size of 100.4 kilobytes. The final digital image has a resolution of 224*224 and the color of each pixel is represented by 3 octets. The converted digital image has a size of 150.6 kilobytes. However, in order to carry out the step of modifying MODIF, it is necessary to reserve a space of the zone of the memory MEM free of a value in the zone located between the low address and the beginning of the intermediate digital image. This free zone must be configured so that the converted digital image can finish at the same level as the intermediate digital image. This free zone must be 50 kilobytes in the example of use of FIG. 6.

Consequently in order to perform the conversion between an initial digital image of size 153.6 kilobytes and a converted digital image of size 150.6 kilobytes, the first embodiment of the method of converting of the invention shown in FIG. 5 requires a zone of the memory MEM of size 203.776 kilobytes.

The method of converting of the invention makes it possible to limit the size of the memory MEM required with respect to the known method of converting.

In a second embodiment of the method of conversion of the invention, the step of redimensioning REDI is carried out by passing through the memory in a first direction and the step of modifying MODIF is carried out by passing through the memory in a second direction. The first direction is opposite the second direction.

This second embodiment of the method of converting of the invention offers the advantage of limiting the size of the memory zone MEM required for the conversion of the initial digital image, with respect to the first embodiment of the method of converting of the invention.

The first direction is passing through the addresses, by incrementing these addresses and the second direction is passing through the addresses, by decrementing these addresses. In this case, the initial digital image is stored continuously in the zone of the memory MEM in such a way that the beginning of the initial image is stored at the low address. The initial digital image is therefore stored at the beginning of the zone of the memory MEM.

The first direction can correspond to the passing through of the addresses, by decrementing these addresses and the second direction can correspond to the passing through of addresses, by incrementing these addresses. In this case, the initial digital image is stored continuously in the zone of the memory MEM in such a way that the end of the initial image is stored at the high address. The initial digital image is therefore stored at the end of the zone of the memory MEM.

Figure 7:
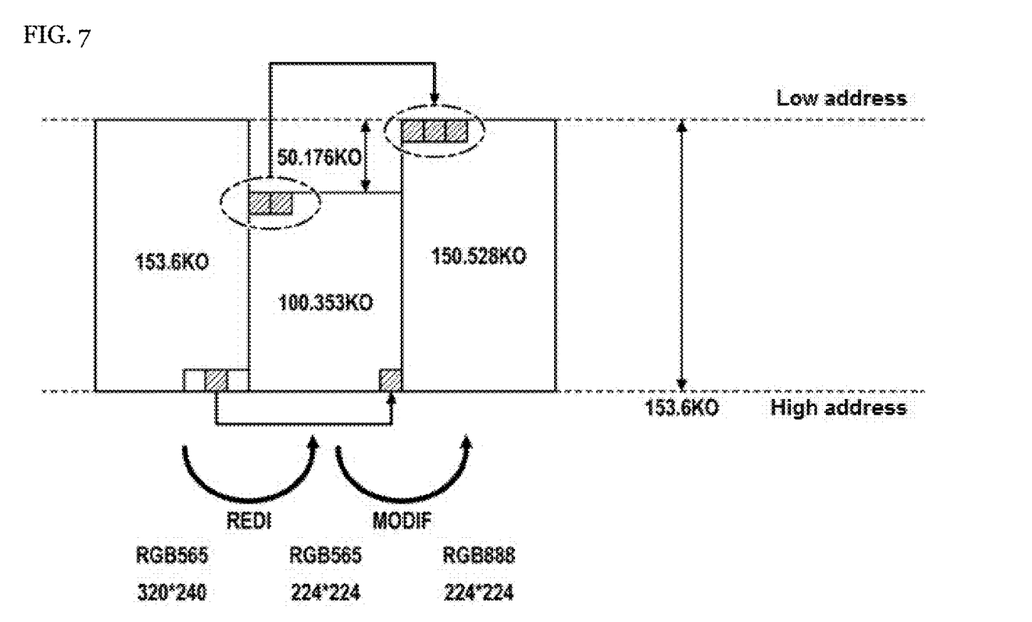
FIG. 7 shows a use of a second embodiment of the method of converting of the invention.

FIG. 7 shows a use of the second embodiment of the method of converting of the invention. In this use, the initial digital image is stored at the beginning of the memory zone. The step of redimensioning REDI is carried out from high addresses and by decrementing the addresses. The ending address of the intermediate digital image is identical to the ending address of the initial digital image.

Thus the beginning address of the intermediate digital image is greater than the low address and therefore the zone of the memory MEM located between the address of the beginning of the intermediate digital image and the low address will be free of value.

In the example of use of FIG. 7, the step of modifying MODIF is carried out by starting with the low addresses and by incrementing the addresses. The starting address of the converted digital image is advantageously equal to the low address.

The second embodiment of the method of converting does not require reserving a specific space of the zone of the memory MEM free of value in the zone located between the low address and the beginning of the intermediate digital image. Indeed this zone located between the low address and the beginning of the intermediate digital image is by construction free of value.

Thus to carry out the conversion between an initial digital image of size 153.6 kilobytes and a final digital image of size 150.528 kilobytes, the second embodiment of the method for converting of FIG. 5 requires a zone of the memory MEM of size 153.6 kilobytes.

The second embodiment of the method of converting of the invention makes it possible to limit the size of the memory zone MEM required with respect to the first embodiment of the method of converting of the invention.

Figure 8:
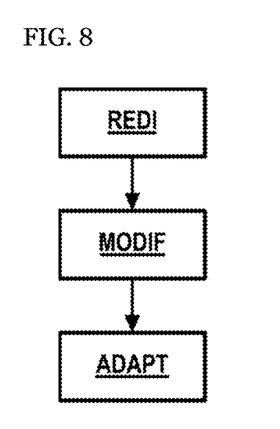
FIG. 8 shows in another way the method of converting of the invention.

FIG. 8 shows the second method for converting in the case where it also comprises a step of adapting ADAPT data so as to adapt the converted digital image to a data format that is expected by the input of the neural network RN.

This step of adapting ADAPT data comprises two substeps:
- a first conversion substep makes it possible to switch from a representation of the color of a pixel over 8-bits with values between 0 and 255 to another representation over 8-bits with values limited by the driving of the neural network (for example between 0 and 1, between −1 and 1, or another interval).
- a second representation substep of the values of the colors of the pixels in a format compatible with the neural network (for example a representation of the fixed point type, or an integer representation (scale*(q−zp)), or other).

What is claimed is:

1. A method for converting an initial digital image into a converted digital image, the initial digital image comprising a set of pixels, the pixels being associated with respective colors, and the converted digital image being usable by a neural network, the method comprising:
    redimensioning the initial digital image to obtain an intermediate digital image, the redimensioning comprising reducing a number of pixels from the initial digital image to the intermediate digital image, the initial digital image being stored in a zone of a memory, the intermediate digital image being generated in the zone of the memory in an overlapping manner with the initial digital image; and
    after the redimensioning, modifying a format of each pixel of the pixels of the intermediate digital image to obtain the converted digital image, the modifying comprising increasing a number of bits used to represent a color of the each pixel, the converted digital image being generated in the zone of the memory in an overlapping manner with the initial and intermediate digital images.

2. The method according to claim 1, wherein:
    the initial digital image is stored at a beginning of the zone of the memory;
    the redimensioning comprises passing through the zone of the memory and incrementing addresses of the zone of the memory; and
    the modifying comprises passing through the zone of the memory and decrementing the addresses of the zone of the memory.

3. The method according to claim 1, wherein:
    the initial digital image is stored at an end of the zone of the memory;
    the redimensioning comprises passing through the zone of the memory and decrementing addresses of the zone of the memory; and
    the modifying comprises passing through the zone of the memory and incrementing the addresses of the zone of the memory.

4. The method according to claim 1, wherein:
    the redimensioning comprises decimating the pixels of the initial digital image.

5. The method according to claim 1, wherein:
    the redimensioning comprises low-pass filtering the initial digital image, then decimating the pixels of the initial digital image.

6. An electronic chip configured to convert an initial digital image into a converted digital image, the initial digital image comprising a set of pixels, the pixels being associated with respective colors, and the converted digital image being usable by a neural network, the electronic chip comprising:
    a memory comprising instructions; and
    a processing unit in communication with the memory, wherein the processing unit executes the instructions to:
        redimension the initial digital image to obtain an intermediate digital image, the redimensioning comprising reducing a number of pixels from the initial digital image to the intermediate digital image, the initial digital image being stored in a zone of the memory, the intermediate digital image being generated in the zone of the memory in an overlapping manner with the initial digital image; and after the redimensioning, modify a format of each pixel of the pixels of the intermediate digital image to obtain the converted digital image, the modifying comprising increasing a number of bits used to represent a color of the each pixel the converted digital image being generated in the zone of the memory in an overlapping manner with the initial and intermediate digital images.

7. The electronic chip according to claim 6, wherein:
the initial digital image is stored at a beginning of the zone of the memory;
the redimensioning comprises passing through the zone of the memory and incrementing addresses of the zone of the memory; and
the modifying comprises passing through the zone of the memory and decrementing the addresses of the zone of the memory.

8. The electronic chip according to claim 6, wherein:
the initial digital image is stored at an end of the zone of the memory;
the redimensioning comprises passing through the zone of the memory and decrementing addresses of the zone of the memory; and
the modifying comprises passing through the zone of the memory and incrementing the addresses of the zone of the memory.

9. The electronic chip according to claim 6, wherein:
the redimensioning comprises decimating the pixels of the initial digital image.

10. The electronic chip according to claim 6, wherein:
the redimensioning comprises low-pass filtering the initial digital image, then decimating the pixels of the initial digital image.

11. A system comprising:
a device configured to acquire an initial digital image comprising a set of pixels, and the pixels being associated with respective colors;
a neural network configured to use a converted digital image; and
an electronic chip configured to convert the initial digital image into the converted digital image, the electronic chip comprising:
a memory comprising instructions; and
a processing unit in communication with the memory, wherein the processing unit executes the instructions to:
redimension the initial digital image to obtain an intermediate digital image, the redimensioning comprising reducing a number of pixels from the initial digital image to the intermediate digital image, the initial digital image being stored in a zone of the memory, the intermediate digital image being generated in the zone of the memory in an overlapping manner with the initial digital image; and
after the redimensioning, modify a format of each pixel of the pixels of the intermediate digital image to obtain the converted digital image, the modifying comprising increasing a number of bits used to represent a color of the each pixel the converted digital image being generated in the zone of the memory in an overlapping manner with the initial and intermediate digital images.

12. The system according to claim 11, wherein:
the initial digital image is stored at a beginning of the zone of the memory;
the redimensioning comprises passing through the zone of the memory and incrementing addresses of the zone of the memory; and
the modifying comprises passing through the zone of the memory and decrementing the addresses of the zone of the memory.

13. The system according to claim 11, wherein:
the initial digital image is stored at an end of the zone of the memory;
the redimensioning comprises passing through the zone of the memory and decrementing addresses of the zone of the memory; and
the modifying comprises passing through the zone of the memory and incrementing the addresses of the zone of the memory.

14. The system according to claim 11, wherein:
the redimensioning comprises decimating the pixels of the initial digital image.

15. The system according to claim 11, wherein:
the redimensioning comprises low-pass filtering the initial digital image, then decimating the pixels of the initial digital image.

16. A non-transitory computer-readable memory comprising program code instructions configured to convert an initial digital image into a converted digital image, the initial digital image comprising a set of pixels, the pixels being associated with respective colors, and the converted digital image being usable by a neural network, and when the program code instructions are executed by an electronic chip, direct the electronic chip to:
redimension the initial digital image to obtain an intermediate digital image, the redimensioning comprising reducing a number of pixels from the initial digital image to the intermediate digital image, the initial digital image being stored in a zone of the memory, the intermediate digital image being generated in the zone of the memory in an overlapping manner with the initial digital image; and
after the redimensioning, modify a format of each pixel of the pixels of the intermediate digital image to obtain the converted digital image, the modifying comprising increasing a number of bits used to represent a color of the each pixel the converted digital image being generated in the zone of the electronic chip memory in an overlapping manner with the initial and intermediate digital images.

17. The non-transitory computer-readable memory according to claim 16, wherein:
the initial digital image is stored at a beginning of the zone of the electronic chip memory;
the redimensioning comprises passing through the zone of the electronic chip memory and incrementing addresses of the zone of the electronic chip memory; and
the modifying comprises passing through the zone of the electronic chip memory and decrementing the addresses of the zone of the electronic chip memory.

18. The non-transitory computer-readable memory according to claim 16, wherein:
the initial digital image is stored at an end of the zone of the electronic chip memory;
the redimensioning comprises passing through the zone of the electronic chip memory and decrementing addresses of the zone of the electronic chip memory; and the modifying comprises passing through the zone of the electronic chip memory and incrementing the addresses of the zone of the electronic chip memory.

19. The non-transitory computer-readable memory according to claim 16, wherein:

the redimensioning comprises decimating the pixels of the initial digital image.

20. The non-transitory computer-readable memory according to claim 16, wherein:

the redimensioning comprises low-pass filtering the initial digital image, then decimating the pixels of the initial digital image.

* * * * *